(No Model.)

W. A. HULL.
CHANDELIER.

No. 258,068. Patented May 16, 1882.

Witnesses:-
T. J. Keane
James R. Bowen

Inventor:-
Wolcott A. Hull
By his atty.
Edwin H. Brown

UNITED STATES PATENT OFFICE.

WOLCOTT A. HULL, OF NEW YORK, N. Y., ASSIGNOR OF ONE-HALF TO THE ANSONIA BRASS AND COPPER COMPANY, OF SAME PLACE.

CHANDELIER.

SPECIFICATION forming part of Letters Patent No. 258,068, dated May 16, 1882.

Application filed January 4, 1882. (No model.)

*To all whom it may concern:*

Be it known that I, WOLCOTT A. HULL, of New York, in the county and State of New York, have invented certain new and useful Improvements in Chandeliers, of which the following is a specification.

My improvements relate particularly to chandeliers which are used as supports for oil-lamps. The object is to provide a means for fastening the lamp-supporting arms to the body of the chandelier which shall be cheap and effective, and so simple that the arms may be shipped, detached from the other parts, and attached after arriving at their destination. Thus much expense will be saved in transportation, and the chandeliers may be transported with much less liability to injury.

The improvements consist in the combination, with the body of a chandelier composed of a disk and inner and outer flanges, projecting from and formed integral with said disk, and each provided with holes radially opposite the holes in the other, of arms inserted into said holes, and pins, screws, or like devices inserted through said disk and transversely through said arms for securing the latter in place. Plugs of wood may be inserted in the ends of the arms, when the latter are hollow, to afford means for securing the pins, screws, or like devices.

Figure 1:
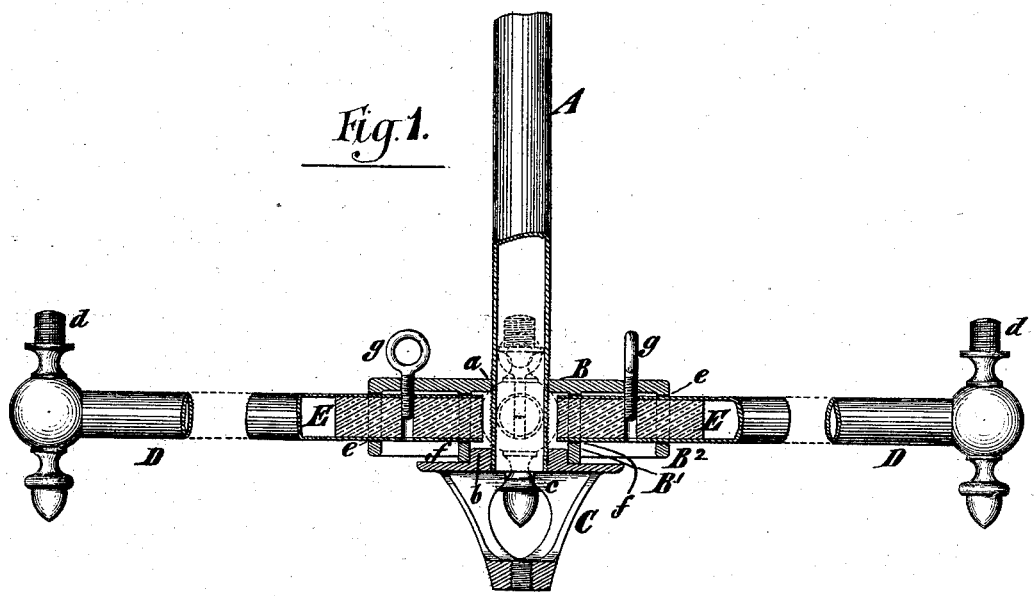
Figure 3:
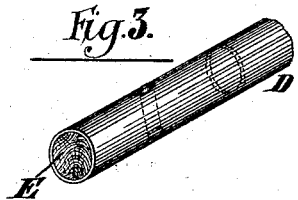
Figure 2:
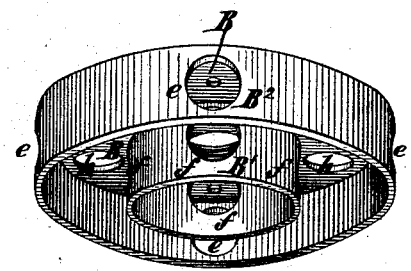

In the accompanying drawings, Figure 1 is a central vertical section of a portion of a chandelier embodying my improvements. Fig. 2 is a perspective view of the body thereof, and Fig. 3 is a perspective view of the end of one of the arms.

Similar letters of reference designate corresponding parts in all the figures.

A designates the stem or shank of a chandelier. As here shown it is made in the form of a tube.

B B' B² designate the body of the chandelier, consisting of a disk, B, provided with two downwardly-extending concentric circular flanges, B' B², formed integral therewith. The disk B has in the center a screw-threaded socket, $a$, in which the stem A fits, and is secured by means of a screw-thread on its exterior engaging with the screw-thread in said socket. When the chandelier is an extensible chandelier the stem A will form a portion of the extensible or lower part of the chandelier. In that event I shall preferably combine with the body B B' B² a fulcrum-piece, C, for a lever, whereby to operate a catch for securing the extensible part to the stationary part. This fulcrum-piece is provided with a boss, $b$, which fits into the flange B' of the body and screws onto the stem A. It is provided with bearings $c$ for the fulcrum of the catch-lever.

D designates arms of the chandelier. They may be of tubular form and provided at the outer end with any device suitable for supporting a lamp, and such device may be of any appropriate form. Such device may consist of a cup for receiving the lamp-reservoir or a nipple for entering the reservoir. In either case such device may be screwed onto a nipple, $d$. Any number of these arms may be used. They are fitted into sockets or holes $f$ $e$, which are radially opposite each other in the flanges B' B² of the body, and they are retained in place by pins or by screws $g$ passing through the disk B of the body and into the arms D.

Plugs E of wood may be inserted in the ends of the arms to afford a means for the screws $g$ to work into. An ornamental shell will preferably surround the body, so as to enhance the appearance of the chandelier as much as possible. The holes in the arms for the reception of the pins or screws whereby they are secured to the body must be drilled so that the arms will, when secured in place, occupy proper positions to support the lamps.

By my improvements I provide so simple a means for fastening the arms of a chandelier in place that they may be transported to their destination before being attached, and may be secured after being received by the purchaser. Thus the cost of shipment will be very greatly reduced, because the bulk of the chandeliers will be reduced, and the liability of the chandeliers to sustain injury will be lessened.

The body B B' B² may be reduced in weight, if desirable, by forming in it holes $h$.

What I claim as my invention, and desire to secure by Letters Patent, is—

1. The combination, with the body of a chandelier, composed of a disk and inner and outer flanges projecting from and formed integral with said disk, and each provided with holes radially opposite the holes in the other, of arms inserted into said holes, and pins, screws, or like devices inserted through said disk and transversely through said arms, substantially as herein described.

2. The combination, with the body of the chandelier, provided with sockets, of tubular arms containing plugs of wood and fitting in said sockets, and screws passing through the body and screwing into the plugs of wood in the said arms, substantially as specified.

3. The combination, with the body B B' B², provided with the sockets $e\ f$, of the arms D and screws $g$, substantially as specified.

4. The combination of the stem A, the body B B' B², screwed thereon, and the fulcrum-piece C, screwed on the stem below the body, substantially as specified.

WOLCOTT A. HULL.

Witnesses:
EDWIN H. BROWN,
T. J. KEANE.